United States Patent [19]

Mago

[11] 4,277,366

[45] Jul. 7, 1981

[54] POLY(ALKYLENE OXIDE) COMPOSITION

[75] Inventor: Blake F. Mago, Pocono Pines, Pa.

[73] Assignee: Union Carbide Corporation, New York, N.Y.

[21] Appl. No.: 79,202

[22] Filed: Sep. 26, 1979

[51] Int. Cl.³ .................. C23F 11/12; C23F 11/14
[52] U.S. Cl. ................... 252/392; 106/14.16; 106/14.42; 252/8.55 E; 252/394; 252/396; 252/403; 252/405; 252/407; 422/13; 422/16
[58] Field of Search ............ 252/392, 394, 396, 403, 252/405, 407, 8.55 E; 422/13, 16; 106/14.16, 14.42

[56] References Cited

U.S. PATENT DOCUMENTS 4,018,703  4/1977  Turner .................. 252/394

Primary Examiner—Richard E. Schafer
Assistant Examiner—Irwin Gluck
Attorney, Agent, or Firm—Franklyn Schoenberg

[57] ABSTRACT

Poly(alkylene oxide) compositions are provided which exhibit excellent resistance to oxidative degradation and inhibit the corrosion of ferrous metals, which compositions have incorporated therein an effective amount of a mononuclear aromatic compound having at least one substituent nitro group.

10 Claims, No Drawings

POLY(ALKYLENE OXIDE) COMPOSITION

BACKGROUND OF THE INVENTION

This invention relates to improved poly(alkylene oxide) compositions and, more particularly, to poly(alkylene oxide) compositions and aqueous solutions thereof that exhibit excellent resistance to oxidation and that inhibit corrosion of ferrous metals with which they come in contact.

Poly(alkylene oxide) polymers have many and diverse industrial applications, providing not only compatibility with water, but good lubricating qualities and stability as well. Thus, these materials have found wide use both as substantially 100 percent active compositions and as aqueous solutions in applications such as hydraulic fluids, metal working lubricants, metal treating formulations, and the like. As with all materials that may contain some water, these must protect metals with which they come in contact, and ferrous metals are of particular interest. Corrosion-inhibitive additives are therefore commonly included in the poly(alkylene oxide) containing compositions for this purpose, and success or failure in a particular application may well depend upon the quality of protection for metals realized in service.

A potential hindrance to the protection accorded is that, like most organic polymers, poly(alkylene oxides) are oxidized by oxygen at elevated temperatures. Even in an aqueous medium, oxidation of the polymer can have a significant effect on the lubricating quality of the fluid. Moreover, the products of oxidation are usually acids that foster corrosion of most metals and further limit the useful life of the polymer-containing compositions.

Heretofore, alkali metal nitrites such as sodium nitrite have been widely used as additives for poly(alkylene oxide) solutions to inhibit corrosion of metals, their powerful passivating effect on ferrous metals being well known. Recently, however, the carcinogenic properties of N-nitrosamines, which are the reaction products of secondary amines with nitrites, have caused serious concern about the advisability of using nitrites; and the replacement of nitrites with additives that do not present a health hazard, yet are effective in corrosion inhibition, is of considerable interest.

Several known corrosion inhibitors were tested for their ability to passivate and protect steel as well as to be compatible with aluminum, brass, copper, and solder coupled to brass. However, it was found that, at elevated temperatures, aqueous poly(alkylene oxide) solutions became acid and deposited solids in the presence of these inhibitors. These phenomena prompted studies of the oxidation of poly(alkylene oxide) solutions which unexpectedly showed that nitrite ions are very efficient in preventing the oxidation of higher poly(alkylene oxide) polymers in hot aqueous solutions, in addition to inhibiting corrosion. Accordingly, it was apparent that a suitable replacement for the alkali metal nitrites in poly(alkylene oxide)-containing compositions must impart resistance to oxidation as well as protection against corrosion. While there are a great number of additives known in the art which inhibit the corrosion of metals or improve the oxidation resistance of organic polymers, to the best of our knowledge, none of these materials have been shown to achieve both effects in an aqueous polymer system.

In accordance with the present invention there is provided a poly(alkylene oxide) composition which exhibits excellent resistance to oxidative degradation and inhibits the corrosion of ferrous metals, having incorporated therein a small effective amount of a mononuclear aromatic compound having at least one substituent nitro group.

There is also provided in accordance with the present invention aqueous poly(alkylene oxide) compositions having incorporated therein a small effective amount of an additive which is a mononuclear aromatic compound having at least one substituted nitro group as hereinabove described. In general, said aqueous poly(alkylene oxide) compositions should contain at least 15 millimoles, and preferably, at least 25 millimoles of said additive per liter of composition.

The nitroaromatic derivative component of the composition is highly efficient in inhibiting both the oxidation of poly(alkylene oxide) polymer compositions, including aqueous solutions thereof, and also the corrosion of ferrous metals contacted by such compositions, while not presenting any known health hazards or toxicological problems.

Poly(alkylene oxide) polymers suitable for use in the compositions of the invention are known compounds, and even though of high molecular weight, are water-soluble. In general, these polymers will contain oxyethylene groups or both oxyethylene groups and higher oxyalkylene groups such as oxybutylene and oxypropylene groups in the molecule, and will have average molecular weights from 400 to 40,000. The proportion of oxyethylene groups in the molecule is such that the poly(alkylene oxide) polymers are soluble in water at ordinary temperatures, and the proportion of oxypropylene or higher oxyalkylene group is such that the poly(alkylene oxide) remains liquid at ordinary temperatures up to a molecular weight of 40,000 and higher, or melts at temperatures below about 60° C. The oxypropylene/oxyethylene molar ratio may vary from zero to about unity. These poly(alkylene oxide) polymers may be made by processes well known in the art by reacting ethylene oxide or mixtures of ethylene oxide and propylene oxide or higher alkylene oxide with a compound having from one up to as many as six active hydrogen atoms, such as water, monohydroxylic alcohols such as ethanol and propanol, dihydroxylic alcohols such as ethylene glycol, trihydroxylic alcohols such as glycerine and trimethylolpropane, tetrahydroxylic alcohols such as pentaerythritol, hexahydroxylic alcohols such as sorbitol, and mono- or poly-functional amines such as butylamine and ethylene diamine. The poly(alkylene oxide) products of such reactions will have linear or branched oxyethylene or oxyethylene-higher oxyalkylene chains, and such chains will terminate with hydroxyl groups. Some or all of these hydroxyl groups may be etherified by reaction with a dialkyl sulfate such as diethyl sulfate.

As hereinabove stated, the poly(alkylene oxide) compositions of the invention can be used in their substantially 100 percent active form or as aqueous solutions thereof. The proportion of poly(alkylene oxide) polymers in such aqueous solutions depends upon the particular application for which they are intended and can be varied within a wide range to obtain the desired results. In general, the aqueous solution contains any amount of polymer from about 0.1 percent by weight to about 50 percent by weight.

An essential component of the compositions of the invention is a mononuclear aromatic compound having at least one substituent nitro group. Suitable nitroaromatic compounds are the nitro-substituted aromatic acids and compounds such as nitroaromatic salts, esters, and the like that, in situ, effect the formation of the acid anion. Exemplary suitable nitroaromatic compounds are 3-nitrobenzoic acid, 4-nitrophthalic acid, 5-nitroisophthalic acid, 3,5-dinitrobenzoic acid, p-nitrocinnamic acid, and the like, and alkali metal or ammonium salts thereof.

As a general rule, the nitroaromatic compounds are used in an amount sufficient to impart the desired degree of corrosion inhibition and oxidation resistance to the composition, depending upon the severity of operating conditions and service requirements for the particular application. The amount used may vary somewhat depending on such factors and can be readily determined by routine experimentation. The maximum amount of such compounds that should be present is not critical, with economic factors generally determining the use of amounts greatly in excess of that actually required. The amount of nitroaromatic compound that should be present will be called herein an "effective amount", which is defined as being above the minimum required to achieve the oxidation resistance and corrosion protection required for a particular application. In general, however, the minimum "effective amount" will be about 18 millimoles of compound per liter of polymer solution.

The compositions of this invention as well as the controls which demonstrate the prior art were evaluated for oxidation resistance and corrosion inhibition as follows. The inhibition of oxidation of aqueous solutions of poly(alkylene oxide) was studied using a 10% solution of the polymer in distilled water heated to 70° C., above which temperature some of this polymer tends to separate from water due to its known inverse solubility. All-glass reaction cells 75 mm in diameter and 200 mm high were used. The cells were equipped via 71/60 ST joints with heads that contained glass joints for inserting a thermometer, an aeration tube, and a reflux condenser. Portions of test solutions weighing 400 grams were charged to each cell and heated to 70° C. in a thermostatically controlled liquid bath for a period of 8 days while sparging continuously with filtered air at a flow rate of 50-100 cc/min. The amount of oxidation that occurred during this period was determined by titrating a sample with standard base and by measuring the change in its viscosity at 40° C.

Studies of corrosion inhibition of aqueous solutions of poly(alkylene oxide) involved immersion tests of panels of steel for eight days in a 10% polymer solution at 70° C. while sparging lightly with air and then measuring weight loss and noting the appearance of the metal and of the solutions. Inasmuch as the corrosion of steel by aqueous poly(alkylene oxide) solutions is more severe under film disruptive conditions such as found in heat exchangers, the corrosion evaluation studies were also made with steel as a heat-transfer surface for a boiling solution using the test apparatus and test procedure described in U.S. Pat. No. 3,951,844. The corrosion inhibiting ability of the various polymer solutions was determined for solutions prepared with distilled water to which, typically, 500 ppm each of sodium chloride, sodium sulfate, and sodium formate were added to simulate typical impurities. The samples used in this study were weighed, cold-rolled 4 inch×4 inch×1/16 inch mild steel plates which had been polished and scrubbed with a wet bristle brush and commercial kitchen powder cleaner, rinsed, and dried. The degree of corrosion was determined from the weight change of the steel panel sample after cleaning, with weight loss being recorded in units of mils per year (mpy).

The invention will become more clear when considered together with the following examples, which are set forth as being merely illustrative of the invention and which are not intended, in any manner, to be limitative thereof. Unless otherwise indicated, all parts and percentages are by weight.

EXAMPLE 1

The apparatus and procedures outlined above were used to evaluate the oxidation resistance and corrosion inhibition of steel for 10% solutions of various poly(alkylene oxide) compositions. In the oxidation and immersion corrosion tests, the poly(alkylene oxide) polymers used were liquid, water-soluble commercial product available under the trademark designation UCON 75-H-90000 (I) and UCON 75-H-1400 (II) from Union Carbide Corporation. In the heat-transfer corrosion tests, the poly(alkylene oxide) polymer used was a liquid, water soluble commercial product available under the trademark designation UCON 75-H-1400 (II) from Union Carbide Corporation. The oxidation and immersion corrosion rates were measured after seven or eight days, and the corrosion rates using the heat-transfer apparatus were measured after 3 days.

In these tests, compositions containing the disodium salt of 5-nitroisophthalic acid in various proportions were compared with compositions prepared without any inhibitor and those containing sodium nitrite inhibitor. The results obtained during the oxidation tests are summarized in Table I, below and the corrosion tests in Table II, below. The data thus presented show that where no inhibitor was used in the aqueous poly(alkylene oxide) composition, significant acidity developed in the solutions during the oxidation test period, and that there was more than a 50% decline in viscosity at 40° C. Moreover, the weight loss of the steel test panels during the corrosion test periods was very high. All of this was almost completely prevented by including as little as 0.1 weight percent (14.5 millimoles per liter) of sodium nitrite in the solution. The disodium 5-nitroisophthalate additive also offered considerable oxidation resistance to the poly(alkylene oxide) solution as well as being efficient in inhibiting the corrosion of steel, when suitable amounts of said additive were employed.

TABLE I

| | OXIDATION INHIBITION OF POLY(ALKYLENE OXIDE) IN 10% AQUEOUS SOLUTIONS | | | | | | |
|---|---|---|---|---|---|---|---|
| | Additive Concentration | | pH | | Acidity Formed | Viscosity Change | |
| Additive | Weight % | m moles/liter | Initial | Final | (Millinormality) | at 40° C. (%) | Solution Appearance |
| None | — | — | 10.2 | 2.9 | 52.0 | −60 | clear colorless |
| Sodium Nitrite | 0.1 | 14.5 | 8.5 | 5.8 | 0.2 | +2 | clear colorless |
| 5-Nitroisophthalic | 0.5 | 72. | 9.1 | 7.0 | | 0 | clear colorless |

TABLE I-continued

OXIDATION INHIBITION OF POLY(ALKYLENE OXIDE) IN 10% AQUEOUS SOLUTIONS

| Additive | Additive Concentration | | pH | | Acidity Formed | Viscosity Change | Solution Appearance |
|---|---|---|---|---|---|---|---|
| | Weight % | m moles/liter | Initial | Final | (Millinormality) | at 40° C. (%) | |
| acid, disodium salt | 0.46 | 18.0 | 11.1 | 8.9 | 4.8 | 0 | clear colorless |
| | 0.79* | 31.0* | 7.4* | 5.7* | 0.16* | 0* | clear colorless* |
| | 1.5 | 59.0 | 7.9 | 7.8 | 0.04 | +6 | yellow |

*Test run for 7 days at 90° C. Poly(alkylene oxide) polymer was UCON 75-H-1400. Other tests run for 8 days at 70° C. with poly(alkylene oxide) polymer I.

TABLE II

CORROSION INHIBITION OF POLY(ALKYLENE OXIDE) IN 10% AQUEOUS SOLUTIONS

| Poly(alkylene-oxide) | Additive | Additive Concentration | | Corrosion Test | Corrosion Rate Mils per year (mpy) | Solution Appearance |
|---|---|---|---|---|---|---|
| | | Weight % | m moles/liter | | | |
| I | none | — | — | Immersion (8 days) | 14.8 | rusty |
| II | none | — | — | Heat-transfer (3 days) | 81 | rusty |
| I | Sodium nitrite | 0.2 | 29 | Immersion (8 days) | <0.04 | clear |
| II | Sodium nitrite | 0.05 | 7.2 | Heat-transfer (3 days) | 5.6 | turbid-orange |
| | " | 0.1 | 14.5 | " | 0.4 | clear colorless |
| | " | 0.25 | 36 | " | 0.5 | clear colorless |
| I | 5-nitroisophthalic acid, disodium salt | 0.8 | 31.0 | Immersion (7 days) | 2.3 | slight turbid amber |
| I | | 1.6 | 62.0 | Immersion (7 days | 0.04 | " |
| II | | 0.46 | 18.0 | Heat-transfer (3 days) | 6.7 | clear yellow |
| II | | 0.79 | 31.0 | " | 2.3 | slight turbid |
| II | | 0.92 | 36.0 | " | 0.3 | |

EXAMPLE 2

The procedure described in Example 1 was used in the study of the oxidation resistance and inhibition of corrosion of poly(alkylene oxide) compositions with a variety of additives. The types and proportions of additives employed in the compositions of this Example and the oxidation resistance are summarized in Table III, below and the corrosion inhibition results of the various compositions are summarized in Table IV, below. Poly(alkylene oxide) I and II are the same polymers employed in the compositions of Example 1, poly(alkylene oxide) I being used in the oxidation and immersion corrosion tests and polymer II being used in the heat-transfer corrosion test. The data thus presented show that nitroaromatic compounds exhibit considerable oxidation protection for the poly(alkylene oxide) solution and when suitable amounts of said additive were employed, offered good corrosion protection to steel. In contrast thereto sodium salicylate, which has a hydroxyl substituent on an aromatic acid nucleus, exhibited good oxidation protection but was not a good corrosion inhibitor for steel; sodium benzoate, which has no substituent on an aromatic acid nucleus, exhibited good corrosion inhibition for steel but afforded poor oxidation resistance; and sodium o-chlorobenzoate and sodium m-sulfobenzoate, which have substituents on the aromatic acid nucleus other than nitro groups, exhibited neither oxidation resistance or suitable corrosion inhibition of steel.

TABLE III

OXIDATION INHIBITION OF POLY(ALKYLENE OXIDE) IN 10% AQUEOUS SOLUTIONS

| Additive | Additive Concentration | | pH | | Acidity Formed | Viscosity Change | Solution Appearance |
|---|---|---|---|---|---|---|---|
| | Weight % | m moles/liter | Initial | Final | (Millinormality) | at 40° C. (%) | |
| none | — | — | 10.2 | 2.9 | 52.0 | −60 | clear colorless |
| sodium salt of m-nitrobenzoic acid | 0.3 | 15.8 | 10.1 | 8.7 | 0.6 | +2 | clear pale |
| sodium salt of p-nitrobenzoic acid | 0.7* | 36.0* | 7.5* | 6.0* | 0.1* | +1* | clear colorless |
| | 1.37 | 72 | 8.9 | 5.2 | >1.2 | — | clear pale amber |
| sodium salt of 3,5-Dinitrobenzoic acid | 0.84 | 36 | 8.5 | 4.9 | 1.0 | — | clear yellow |
| | 0.85* | 36* | 7.5* | 5.4* | 0.1* | 0* | clear yellow |
| sodium salt of salicylic acid | 0.58 | 36 | 9.9 | 8.7 | 1.0 | +3 | clear colorless |
| sodium salt of benzoic acid | 1.0 | 69 | 10.3 | 4.2 | 47 | −52 | clear colorless |
| sodium salt of o-chlorobenzoic acid | 1.3 | 73 | 7.7 | 3.8 | 35 | −47 | clear colorless |
| sodium salt of m-sulfobenzoic acid | 1.8 | 80 | 7.9 | 4.3 | 34 | −49 | clear colorless |

*Tests were run for 7 days at 90° C. with polymer II; other tests were run for 8 days at 70° C. with polymer I.

TABLE IV

CORROSION INHIBITION OF POLY(ALKYLENE OXIDE) IN 10% AQUEOUS SOLUTIONS

| Poly(alkylene-oxide) | Additive | Additive Concentration Weight % | m moles/liter | Corrosion Rate (mpy) Immersion Test (8 days) | Heat Transfer (3 days) | Solution Appearance |
| --- | --- | --- | --- | --- | --- | --- |
| I | none | — | — | 14.8 | — | rusty |
| II | none | — | — | — | 81 | rusty |
| I | sodium salt of m-nitrobenzoic acid | 0.69 | 36 | — | — | rusty |
| I | | 1.37 | 72 | 0.2 | — | clear amber |
| II | | 0.34 | 18 | — | 23 | turbid orange |
| II | | 0.68 | 36 | — | 0.3 | clear colorless |
| II | | 0.68 | 36 | — | 0.5 | clear colorless |
| I | sodium salt of p-nitrobenzoic acid | 0.5 | 26 | 28 | — | — |
| I | | 0.69 | 36 | 0.3 | — | slight turbid yellow |
| I | | 1.37 | 72 | 0.1 | — | clear pale amber |
| II | sodium salt of p-nitrobenzoic acid | 0.34 | 18 | — | 22 | turbid yellow |
| II | sodium salt of p-nitrobenzoic acid | 0.68 | 36 | — | 5.7 | slight turbid amber |
| II | sodium salt of p-nitrobenzoic acid | 0.68 | 36 | — | <0.1 | clear colorless |
| I | sodium salt of 3,5-Dinitrobenzoic acid | 0.5 | 21 | 4.6 | — | clear dark amber |
| I | | 0.84 | 36 | 0.2 | — | slightly turbid |
| II | sodium salt of 3,5-Dinitrobenzoic acid | 0.21 | 9 | — | 70 | rusty |
| II | sodium salt of 3,5-Dinitrobenzoic acid | 0.42 | 18 | — | 0.9 | clear amber |
| II | sodium salt of 3,5-Dinitrobenzoic acid | 0.84 | 36 | — | 0.3 | clear yellow |
| I | sodium salt of benzoic acid | 1.0 | 69 | 0.9 | — | rusty |
| II | | 0.5 | 35 | — | 53 | turbid brown |
| II | sodium salt of salicylic acid | 0.58 | 36 | — | 31 | clear very red |
| II | sodium salt of o-chlorobenzoic acid | 0.64 | 36 | — | 38 | turbid brown |
| II | sodium salt of m-sulfobenzoic acid | 0.93 | 41 | — | 54 | turbid |

Although this invention and various of the benefits thereof, such as providing poly(alkylene oxide) compositions which exhibit both excellent resistance to oxidative degradation and inhibit the corrosion of ferrous metals while not presenting any known health hazards or toxicological problems have been described in its preferred forms, with a certain degree of particularity, it is understood that the present disclosure has been made only by way of example, and that numerous changes can be made without departing from the spirit and the scope of the invention.

What is claimed is:

1. A poly(alkylene oxide) composition having incorporated therein an effective amount of a mononuclear aromatic compound having at least one substituent nitro group.

2. An aqueous composition comprising said poly(alkylene oxide) composition of claim 1 and water.

3. The composition as claimed in claim 1 wherein said mononuclear aromatic compound is a nitro substituted aromatic acid.

4. The composition of claim 3 wherein said composition has incorporated therein the sodium salt of said nitro substituted aromatic acid.

5. The composition as claimed in claim 1 wherein said nitroaromatic compound is a nitroaromatic salt or ester that in situ forms an acid ion.

6. The composition of claim 1 wherein said nitroaromatic compound is selected from the group consisting of nitrobenzoic acid, 4-nitrophthalic acid, 5-nitroisophthalic acid, 3,5-dinitrobenzoic acid, and salts thereof.

7. The composition of claim 1 wherein said poly(alkylene oxide) is characterized by the presence of both oxyethylene groups and higher oxyalkylene groups.

8. The composition of claim 2 containing at least about 15 millimoles of said nitroaromatic compound per liter of composition.

9. The composition of claim 2 which contains from about 0.1 percent to about 50 percent by weight of poly(alkylene oxide).

10. The composition of claim 2 wherein said nitroaromatic compound is selected from the group consisting of nitrosubstituted aromatic acids and nitroaromatic salts or esters that in situ forms an acid ion.

* * * * *